Feb. 18, 1964 J. J. WORMSER 3,121,846

SOLID STATE COMMUTATOR WITH SEQUENTIALLY OPERATED OSCILLATORS

Filed Nov. 4, 1960 2 Sheets-Sheet 1

INVENTOR.
JOSEPH J. WORMSER

WITNESS

Nicholas Leszczak

BY

Marshall J. Breen
ATTORNEY

WITNESS.
Nicholas Leszczak

INVENTOR.
JOSEPH J. WORMSER
BY
Marshall J. Breen
ATTORNEY.

United States Patent Office 3,121,846
Patented Feb. 18, 1964

3,121,846

SOLID STATE COMMUTATOR WITH SEQUENTIALLY OPERATED OSCILLATORS

Joseph J. Wormser, Monroe, Conn., assignor to The Singer Manufacturing Company, Elizabeth, N.J., a corporation of New Jersey Filed Nov. 4, 1960, Ser. No. 67,347
4 Claims. (Cl. 331—49)

This invention relates to a solid state commutator and more particularly to a ring configuration of transistors which provides high speed continuous sequential switching for a plurality of external circuits on a time-sharing basis.

In the United States patent application Serial No. 610,526, filed September 18, 1956 there is shown and described a sensor apparatus for detecting motion in an R.F. field in which a radiating oscillator is periodically interrupted and the period of interruption is responsive to motion of an object in the R.F. field. Detection of a change in the period is thus indicative of motion in the field. Many applications for this device require that a plurality of sensors be used in close proximity for protecting a large area. Overlapping R.F. fields in such applications can cause a serious problem in inter-unit interference. The problem can be solved by switching sensors on and off sequentially on a time-sharing basis. In this instance, only one R.F. field would be generated at a time and the condition for adverse interaction would, therefore, not exist.

The required switching action or, more specifically, commutating action, must be done with sufficient speed so as not to generate interference with circuits processing the motion alarm signal. A mechanical commutator would not have the necessary speed characteristics; nor would it have desirable wear-out and noise characteristics.

It has been found that an electronic commutator comprising transistor switching circuits in a sequentially operating ring configuration is fast, durable, and noiseless and thus is feasible for this application.

It is an object of this invention to provide a solid state commutator for sequentially switching circuits at a high rate and with good accuracy and without the use of mechanical make-and-break devices.

It is a further object of this invention to provide a ring configuration of transistors for sequential switching including means for directed starting which insures the proper switching mode.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
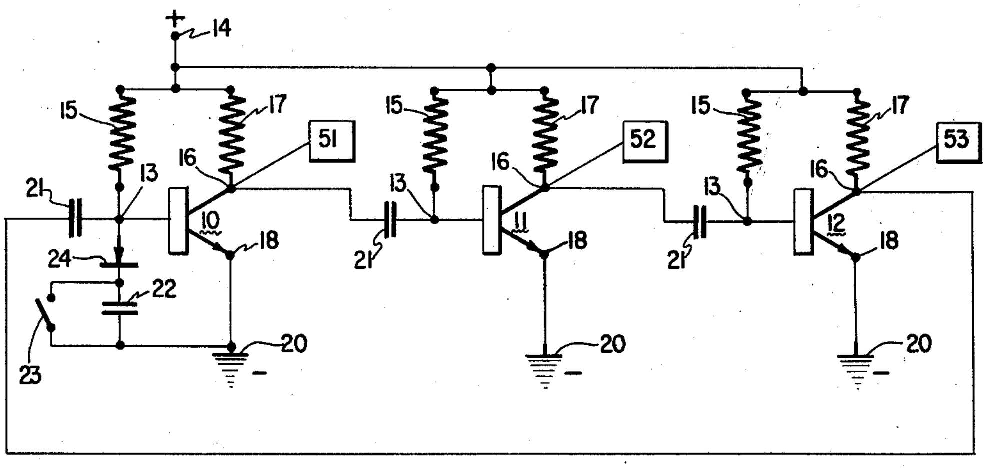
FIG. 1 is a circuit diagram of the basic ring configuration embodying the invention.

Referring now to FIG. 1, three NPN type transistors 10, 11 and 12 are shown in a cascaded closed ring configuration each transistor being connected for common emitter operation. Each base terminal 13 is connected to a common positive voltage 14 through a respective resistor 15. Each collector terminal 16 is connected through a respective resistor 17 to the common positive voltage 14 and each emitter terminal 18 is connected to the negative end 20 of the supply voltage. Each collector terminal 16 is connected through a respective capacitor 21 to the base terminal 13 of the next transistor in the sequence. In FIG. 1, 51, 52 and 53 indicate slave transistors driven respectively by the ring transistors 10, 11 and 12 as will be described later.

The base biasing resistor 15 is chosen so that each transistor is normally forwardly biased to be slightly conducting in its quiescent state. That is, it requires only a slight negative trigger voltage applied to the base to drive each transistor into cut-off. This cut-off value is shown by the dashed lines 50 in the curves of FIG. 2. It will be observed that this cut-off voltage is a very small fraction of the negative trigger pulse height. Such a negative going trigger pulse is obtained by the differentiation action of the capacitor 21 on the output pulse of the preceding transistor. It will be seen that if only two transistors are used in this closed ring configuration, the well-known conventional astable multivibrator results and each transistor is turned on and off in proper time-sharing sequence. That is to say, with the ring of two transistors there is no improper mode in which the transistors are on or off at the same time. However, when more than two transistors are connected in the ring configuration shown, it is important to carefully direct the starting operation. For example, if the voltage source 14—20 is applied to the circuit of FIG. 1, it is likely to start in a sporadic mode in which all transistors conduct together or in a false mode in which transistors 10 and 12 conduct together and alternately with transistor 11. This obviously does not produce proper sequential operation wherein as one transistor turns on the next must turn off in sequence around the ring.

It has been found that proper starting can be accomplished by holding any one of the transistors in a non-conducting state for a period of time long enough to assure quiescence. Next, said transistor must be switched into conduction with a smooth transition. Unfortunately, mechanical starter switches generate transients which can trigger an improper sequence. A quieting capacitor 22 connected across the manual switch 23 as in FIG. 1 will eliminate the transients but will adversely load the input triggering signal. A non-conducting diode 24 connected in series as shown will isolate the loading effect of the capacitor. This diode arrangement is polarized to conduct the required D.C. starting current.

*Operation*

Assume that the switch 23 is closed thus clamping the base of transistor 10 to ground and thus preventing it from conducting. This effectively breaks the feedback loop and transistors 11 and 12 conduct slightly in their quiescent state. When the switch 23 is opened at time $T_1$ transistor 10 conducts and its collector voltage shows a negative step as at curve 26 in FIG. 2. Capacitor 21 differentiates this step and discharges through resistor 15 to produce at the base of transistor 11 a negative pulse shape as at 27 in FIG. 2. This pulse drives transistor 11 to cut-off at 28 in FIG. 2 and, on its discharge when it again reaches the cut-off level at 29, transistor 11 conducts producing an output pulse 30 at the collector. Capacitor 21 differentiates this pulse and produces at the base 13 the negative trigger pulse 31 shown which drives transistor 12 to cut-off and then to conduction to produce the output pulse 32. This output pulse 32 is differentiated by capacitor 21 to furnish negative trigger pulse 33 to the base of transistor 10 which by turn-off and turn-on produces the output pulse 34. This completes the ring sequence which is repeated until the circuit is traumatically disturbed as, for example, by failure and restoration of the power supply which may induce an improper sequence mode, in which case, the proper sequence may be restored by again starting as above described. It will be noted that the positive trigger pulses 35 have no switching effect on the associated transistors except for driving them further into conduction. All switching is done by the negative trigger pulses 27, 31, 33. It is seen that by the arrangement described above, the turning on of one transistor triggers the turning off of the next transistor in the ring.

It is seen that the ring transistors 10, 11 and 12 are normally conducting and are turned off in sequence. The desired switching function is the inverse of this and requires switches that are normally off and are turned on in sequence. This can be obtained by using the output pulses from the transistors 10, 11 and 12 to drive directly coupled second transistors 51, 52 and 53 whose output state controls the switching function. This is shown for one coupled pair in FIG. 3 wherein transistor 51 has its base directly coupled to the collector of ring transistor 10.

Figure 2:
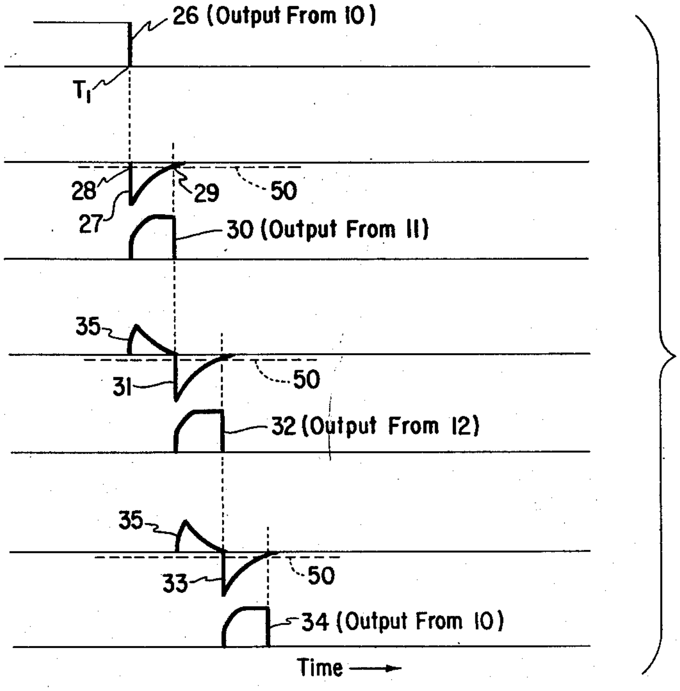
FIG. 2 is a diagram showing the voltage wave forms of various parts of the circuit of FIG. 1 drawn to a common time base.
Figure 3:
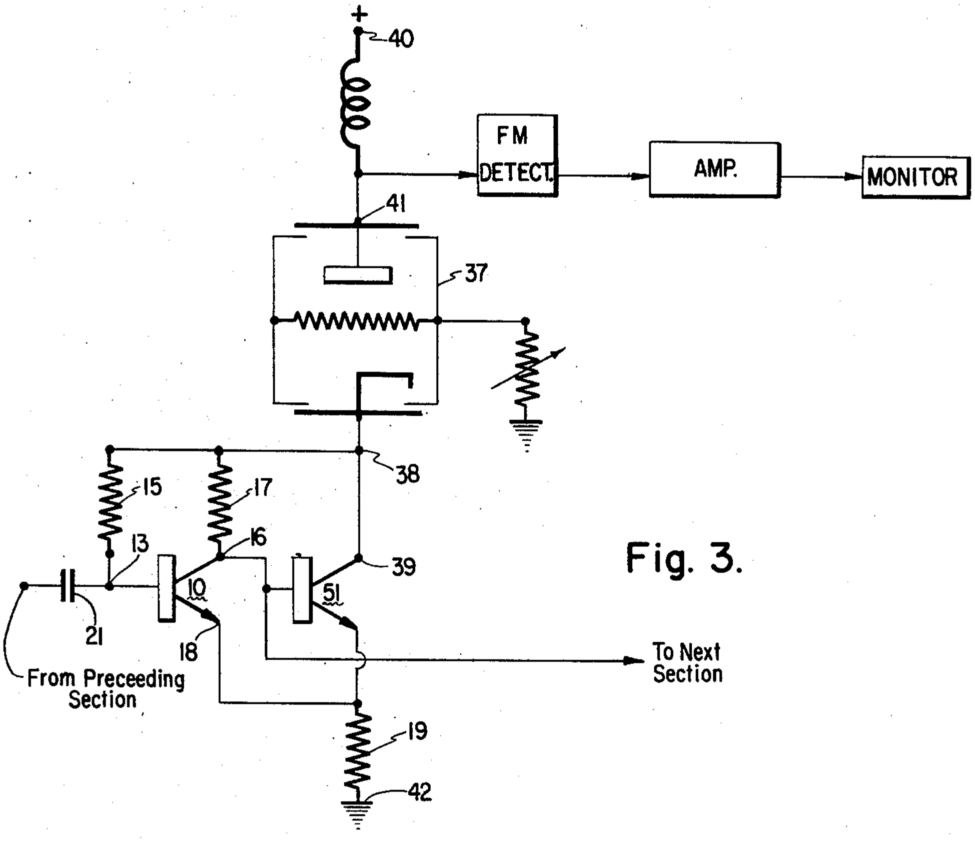
FIG. 3 is a circuit diagram showing an arrangement for obtaining an external switching function as applied to the keying or gating of an oscillator.
Figure 4:
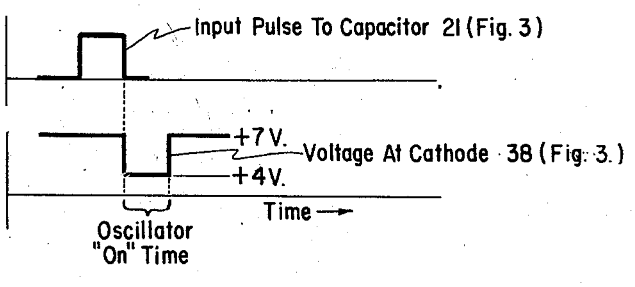
FIG. 4 is a diagram of voltage wave forms of parts of the circuit of FIG. 3 drawn to a common time base.

It will be noted in FIG. 3 that a resistor 19 is inserted between the common emitter connection of the two transistors 10 and 51 and ground. This has a regenerative effect and enhances the ouput wave form. Thus the wave forms in FIG. 4 are squared as compared with their counterparts as shown in FIG. 2.

FIG. 3 also shows the application of the switching function of the ring commutator to the sensor unit shown and described in the above mentioned patent application Serial No. 610,526. The sensor oscillator 37 has its cathode 38 connected to the collector 39 of the switching transistor 51. Positive voltage 40 is applied to the plate 41 of the oscillator 37 and the negative side 42 of the supply voltage is at ground. As the transistor 51 is switched on and off, the cathode to ground voltage in a specific case goes from +4 to +7 volts as shown in FIG. 4. This is sufficient to swing the oscillator 37 grid bias into and out of cut-off and thus to periodically key the oscillator off and on as desired.

The cathode voltage, although variable as seen, remains positive and is suitable as a supply voltage for the transistors. The obviously poor regulation regenerates the switching action of the transistor and thus does not adversely affect the transistor triggering which furthermore is done at a low level. This feature greatly enhances the utility of the circuit by not requiring a separate power supply for the transistors.

It will be apparent to one skilled in the art that, by opening the feed-back connection at any one point, the circuit of FIG. 1 may be used for one-shot sequential switching. It also is evident from the accurate time spacing and shape of the pulses 30, 32 and 34 of FIG.

2 that this circuit may be used as a distortionless pulse delay line.

In a practical embodiment of this invention the following specific components have been used:

| | |
|---|---|
| Vacuum Tube Oscillator 37 | RCA 6562. |
| Transistors 10, 11, 12, 51, 52, 53 | Transitron ST9. |
| Resistor 15 | 39000 ohms. |
| Resistor 17 | 4700 ohms. |
| Resistor 19 | 47 ohms. |
| Capacitor 21 | 0.01 microfarad. |
| Capacitor 22 | 0.10 microfarad. |
| Diode 24 | Transitron SG703. |
| Voltage 40 | 120 volts. |

With the above values, a switching rate of 1000 per second has been obtained.

Having thus disclosed the nature of this invention, what I claim herein is:

1. A solid state commutator comprising a closed sequential ring configuration of $n$ transistors, each connected in the common emitter mode and biased for slight conduction in the quiescent state in which $n$ is an integer greater than 2, having the collector of each transistor coupled through a respective capacitor to the base of the next transistor in sequence, with provision for directed starting including a switch for connecting the base of any one of said transistors to a voltage to bias it off, a capacitor in shunt with said switch and a diode in series with said base and said switch and polarized to apply said biasing voltage to said base in the closed position of said switch.

2. Apparatus according to claim 1 in which each transistor has a base biasing resistor which forms with each respective coupling capacitor a differentiating circuit to shape a triggering pulse for each transistor from the output pulse of each preceding transistor.

3. A circuit for turning on a plurality of oscillators in time sequential relation so that only one oscillator is on at any time comprising a closed ring configuration of $n$ transistors, each connected in the common emitter mode, in which $n$ is an integer greater than 2, having the collector of each ring transistor coupled through a respective capacitor to the base of the next ring transistor in sequence, a slave transistor for each of said ring transistors, each slave transistor having its base directly connected to the collector of its respective ring transistor and its emitter directly connected to the emitter of its respective ring transistor, and the collector of each slave transistor being connected to the cathode of a respective oscillator.

4. A system for switching a plurality of independent circuits in periodic time sequential relation so that only one circuit is closed at any time comprising a closed ring configuration of $n$ transistors, each connected in common emitter mode, in which $n$ is an integer greater than 2, having the base of each ring transistor biased for slight conduction in its quiescent state, the collector of each ring transistor being coupled through a respective capacitor to the base of the next ring transistor in sequence, a slave transistor for each of said ring transistors, each slave transistor having its base directly connected to the collector of its respective ring transistor and its emitter directly connected to the emitter of its respective ring transistor, and a single common power supply for the system.

References Cited in the file of this patent

UNITED STATES PATENTS 2,876,365 Slusser ---------------- Mar. 3, 1959